US007201865B2

(12) United States Patent  (10) Patent No.: US 7,201,865 B2
Hansen  (45) Date of Patent: *Apr. 10, 2007

(54) METHOD OF MANUFACTURING FOAM CORE BOAT COLLARS

(75) Inventor: William M. Hansen, Port Orchard, WA (US)

(73) Assignee: Safe Boats International, L.L.C., Port Orchard, WA (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/867,379

(22) Filed: Jun. 14, 2004

(65) Prior Publication Data

US 2005/0023713 A1  Feb. 3, 2005

Related U.S. Application Data

(63) Continuation-in-part of application No. 10/462,088, filed on Jun. 13, 2003, now Pat. No. 7,070,730.

(51) Int. Cl.
*B29C 67/20* (2006.01)

(52) U.S. Cl. .......................... 264/314; 29/446; 53/438; 264/321

(58) Field of Classification Search ................ 264/321, 264/313, 316, 314; 53/438; 29/448, 446
See application file for complete search history.

(56) References Cited

U.S. PATENT DOCUMENTS

| 3,853,334 | A |   | 12/1974 | Auman et al. |
| 3,935,690 | A | * | 2/1976  | Lea et al. .................... 53/397 |
| 4,025,974 | A | * | 5/1977  | Lea et al. .................... 5/709 |
| 4,841,713 | A |   | 6/1989  | Beier |
| 4,901,676 | A |   | 2/1990  | Nelson |
| 5,075,913 | A | * | 12/1991 | Luchonok ..................... 5/684 |
| 5,878,685 | A |   | 3/1999  | Hemphill et al. |
| 6,331,131 | B1|   | 12/2001 | Selevan |

* cited by examiner

*Primary Examiner*—Allan R. Kuhns
(74) *Attorney, Agent, or Firm*—Christensen O'Connor Johnson Kindness PLLC

(57) ABSTRACT

Methods for fabricating foam cored items in which the foam core is tightly encased by an outer shell. The foam core is compressed, reducing a characteristic dimension, thereby facilitating installation and/or removal of the foam. The foam is then allowed to expand to the desired size. The methods are particularly suited for fabricating foam collars that are located above the chine of a boat and extend longitudinally along the sides of the boat to provide stabilization for the boat during high performance maneuvering and/or provide a fendering system.

42 Claims, 6 Drawing Sheets

METHOD OF MANUFACTURING FOAM CORE BOAT COLLARS

CROSS-REFERENCE TO RELATED APPLICATION

This application is a continuation-in-part of prior application Ser. No. 10/462,088, filed Jun. 13, 2003 now U.S. Pat. No. 7,070,730, priority from the filing date of which is hereby claimed under 35 U.S.C. § 120.

FIELD OF THE INVENTION

This invention generally relates to a method for manufacturing items that includes a relatively flexible shell-like sleeve that tightly encapsulates a core of expanded polymeric foam material. The invention is particularly suitable for and directed to the manufacture of foam core collars that serve as boat sponsons or fenders.

BACKGROUND OF THE INVENTION

Plastic foam material manufactured by expanding polymeric beads of polyethylene, polypropylene, and polyurethane is used in a variety of situations. In some situations, finished products are formed by, for example, casting or molding the polymeric material in the presence of a blowing agent. In other cases, sheets or a block of foam that can be used for protective packaging or for additional processing by machining or other techniques are molded or otherwise formed that result in a desired product or product component. Advantageously, the process used to form the foam material and foam products can be controlled to establish a relatively wide density range. Further, the foam material and products exhibit a number of desirable properties, such as relatively high energy absorption, resistance to denting or scarring caused by impact, and light weight and resistance to chemicals and other substances. However, situations exist in which it is necessary or desirable to either coat the exterior of an item formed of expanded polymeric plastic foam with protective material to form a shell-like skin layer or to encase the foam with a relatively flexible sleeve formed of fabric that is coated or impregnated with protective material. Applying a protective coating to the exterior of an item formed of expanded polymeric plastic foam is somewhat disadvantageous in that several additional manufacturing steps are often required to obtain the desired protective coating. For example, it may be necessary or desirable to sequentially coat the foam item with different types of material. Typically, each coat must be allowed to cure or dry prior to proceeding with additional steps of a manufacturing process. On the other hand, encasing an item formed of expanded polymeric plastic foam with a protective sleeve can result in problems from the standpoint of serviceability, appearance, and performance unless the sleeve is placed under tension so that the sleeve is of a uniform, desired contour and shape.

Among the situations in which polymeric plastic foam material is either coated with protective material or is located within a protective sleeve is the fabrication of foam members, commonly called collars, that are affixed to the external surfaces of boat hulls to serve as stabilizers or fenders. By way of example, U.S. Pat. No. 5,282,436, U.S. Pat. No. 5,647,297, and U.S. Pat. No. 5,870,965, issued to Hansen, incorporated herein in their entirety by this reference, disclose high performance boats that are stabilized through the use of polymeric foam stabilizers. In the arrangement of Hansen, the foam stabilizers are mounted on the sides of the hull above the chine and extend from stern to bow. The foam stabilizers of the Hansen patents are not in contact with the water when the boat is at rest or is being operated at cruising speed. However, when the boat lists during high-speed turns, the stabilizers enter the water and provide a righting moment that decreases list relative to what would otherwise be present. Although the stabilizers used in the Hansen patents are preferably formed from a foam such as closed cell polypropylene or polyethylene that does not absorb water and exhibits fair resistance to dents and chemicals, increased damage tolerance and tolerance to sunlight can be achieved by coating the exterior of the foam stabilizers with a protective material.

Examples of boat collars that employ sleeves that contain polymeric foam material include published U.S. Patent Application No. 2002/0096101 of Hansen and U.S. Pat. No. 6,371,040 to Hemphill et al. (each of which is hereby incorporated by reference). Although the Hansen patent application and the Hemphill et al. patent differ in several aspects, the arrangements disclosed in both of these references employ a cylindrical sleeve that is similar to conventional inflatable flotation collars and is only partially filled with expanded polymeric foam. More specifically, the polymeric foam used in the arrangement of Hemphill et al. is tubular, circumferentially surrounding and encasing an inflatable air bladder. In the Hansen patent application, polymeric foam inserts are employed that do not completely fill the sleeve with inflatable air bladders being located in regions of the sleeve that do not contain the foam inserts. In both the Hemphill et al. and Hansen arrangements, the air bladders are inflated to place the sleeve under tension to thereby provide a collar of desired shape, contour, and firmness.

The solid foam boat collars described in the Hansen patents and the partially foam filled collars described in the Hemphill et al. patent and the Hansen patent application all function satisfactorily from the standpoint of stabilizing a boat and/or providing a fendering system. Nonetheless, a need exists for boat collars that incorporate the structural simplicity, ruggedness, and durability of solid foam collars while simultaneously presenting advantages from the standpoint of ease of fabrication and the efficient manufacture and repair of foam collared boats.

SUMMARY OF THE INVENTION

In its most general aspect, the invention provides a method for fabricating items of manufacture in which polymeric foam that defines the size and shape of the item is firmly encased by a shell-like skin layer. In accordance with the invention, the encased foam is formed of a compressible polymeric foam material that returns to its original shape and volume when compressive forces are removed. One step of the method of the invention includes casting or machining the foam material so that it corresponds in shape and contour to the manufactured item, with the cast or machined foam being larger than the finished item of manufacture. The cast or machined foam is then compressed so that its size and volume is less than that of the item being manufactured. In some applications of the invention, the compressed foam is inserted into a relatively flexible shell or sleeve that corresponds to the shape and size of the item being manufactured. The opening that allows placement of the foam in the shell is then closed. Because the shell does not allow the foam to totally return to its original size, the shell is placed under tension to tightly enclose the foam. By suitably selecting the density of the foam and the degree to which the fully expanded foam is oversize, a desired degree of rigidity can be attained. In other applications of the invention, a portion of the foam that will fill the shell or sleeve is compressed while it is in place within the shell or sleeve. Following compression, an additional foam piece is inserted in the sleeve or shell with the compressed foam portion. The opening of the shell is then closed and the foam expands to place the shell under tension.

In the specific application of the invention for manufacturing foam boat collars, the relatively flexible sleeve is tubular and is fabricated from fabric such as woven or knitted polyester and/or nylon coated with polyurethane or polyurethane blended with polyvinylchloride (PVC). Synthetic rubbers such as chlorosulfonated polyethylene (commonly identified by the trademark "HYPALON") may also be used. Regardless of the material employed, the tubular sleeve is dimensioned and shaped to match the contour of the boat on which the collar is to be mounted and, in addition, to define a desired cross-sectional geometry (e.g., round, oval, or D-shaped). To allow placement of foam within the tubular sleeve, an opening extends along the perimeter of the sleeve. Preferably, the opening is either equipped with a single zipper or two zippers that are sewn or thermally welded one on top of the other and operated by a common opening and closing pull.

In one method of practicing the invention, polymeric foam that matches the entire cross-sectional geometry of the collar being manufactured, but is dimensionally larger than the interior of the tubular sleeve is compressed and is placed inside the tubular sleeve while it is in a compressed state. In a second method of practicing the invention, foam that matches a portion of the cross-sectional geometry of the collar is placed within the sleeve and compressed while it is located inside the sleeve. Additional foam that completes the collar cross-sectional geometry is then placed in the sleeve with the compressed foam. In many cases, sections of compressed foam that collectively will make up the boat collar are placed in abutment with one another along the length of the tubular sleeve, thus allowing the foam to be easily be inserted in the sleeve, especially with respect to long sleeves and regions that are curved or angled to match hull shape.

Regardless of whether the foam is compressed prior to placement in the sleeve or a portion of the foam is compressed while positioned within the sleeve, the zipper or other arrangement used to access the interior of the sleeve is closed while the foam is still compressed. In practicing the invention to manufacture boat collars, the degree of oversize to which the foam was originally fabricated does not allow the foam to fully expand. Specifically, the expanding foam presses against the tubular sleeve placing it under tension. Since the tubular sleeve exhibits limited stretching or flexure, the foam remains under compression. As a result, a collar fabricated in accordance with the invention exhibits physical properties such as energy absorption and resistance to dents, dings, and chemicals that match or surpass the corresponding physical properties of prior art boat collars. Moreover, the buoyancy of the foam collars provides substantial flotation to keep a boat afloat under emergency situations such as swamping or capsizing.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1–4 depict methods of compressing polymeric foam that are alternatives to the hereinafter-described mechanical and pneumatic methods. Specifically, FIGS. 1–4 depict exemplary arrangements for compressing polymeric foam using air bladders to exert the compressive force, with:

FIG. 1 illustrating, in cross-section, an arrangement in which elongate sections of foam can be compressed for fabricating foam core boat collars;

FIG. 2 illustrates an arrangement that can be used as an alternative to the arrangement of FIG. 1;

FIG. 4 illustrates another alternative arrangement utilizing an inflatable bladder that is installed in situ with the foam core.

DETAILED DESCRIPTION OF THE PREFERRED EMBODIMENT

Figure 1:
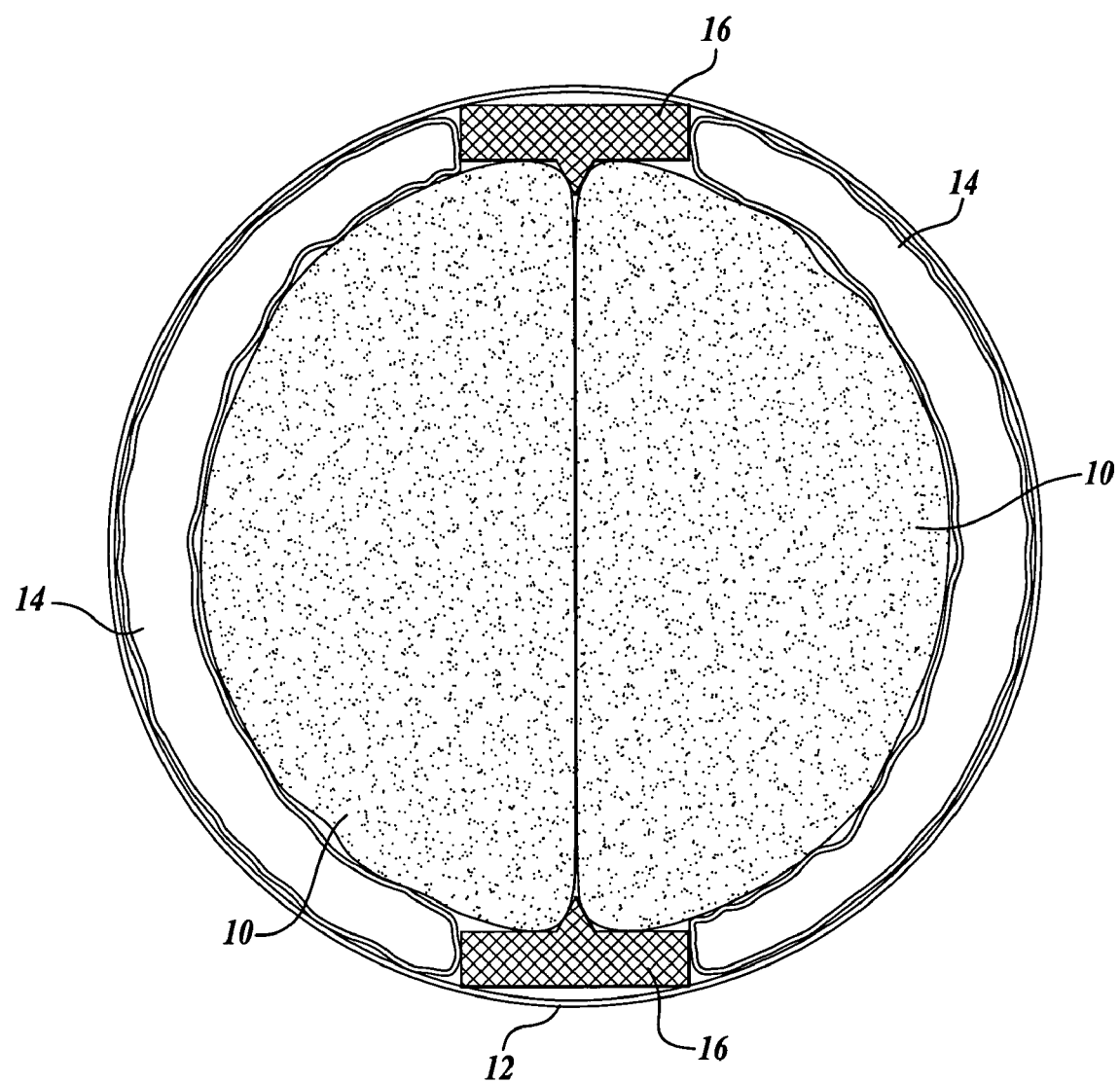

The invention will now be described as it specifically relates to the fabrication of foam collar stabilization and fendering systems for boats. Upon understanding the use of the invention in that particular context, those skilled in the art will recognize that the invention can be employed to fabricate other items that primarily consist of a polymeric foam core that is encased by or coated with a protective and/or decorative skin layer. Use of the invention can be especially advantageous as an alternative to prior art processes in which multiple steps are used to coat an item formed of polymeric foam in order to provide a reinforced skin layer.

Regardless of whether the item being fabricated is a foam boat collar or another item, the invention basically comprises four primary operations. The first operation is the fabrication of a relatively flexible sleeve or shell that, at the end of the process, will define the object's size and shape and will fully enclose a foam core. The fabricated sleeve or shell includes an opening that allows access to the interior of the sleeve or shell and is of sufficient size to allow placement of the polymeric foam in the sleeve or shell. A zipper or other means of closing the opening is also included.

The second operation is forming (e.g., casting or machining) the polymeric foam that is to be enclosed by the sleeve or shell. The type of foam to be used is selected on the basis of the desired weight of the item being manufactured (i.e., determined by foam density and object size), impact resistance, and other physical properties of the foam that are specified by the manufacturers that supply polymeric foams. In all cases, the foam that is used in the practice of the invention is compressible and exhibits a "memory" that restores the foam to its original shape and size (within at least a few percent) when the compressive force is removed. Further, regardless of the technique used to form the polymeric foam material, the foam core that results from the forming operation corresponds to the shape of the object that is being fabricated but is dimensionally larger.

The third operation is compressing of the foam core. In the current practice of the invention, the foam core (or individual foam sections that can be assembled to make up the core) is compressed by a mechanical compression technique by pneumatically compressing the foam in a hyperbaric chamber or by compressing the foam with air bladders that are inflated while the foam and one or more air bladders are positioned within a surrounding structure that causes the air bladders to exert pressure on the surface of the foam.

The mechanical compression technique is useful in fabricating objects such as foam collars that are of substantially circular or other smooth and uniform cross-sectional geometry. Specifically, polycarbonate sheeting or other suitable material is wrapped about the periphery of the foam object with edges of the sheeting overlapping one another and with the sheeting extending over at least the full length of the foam object. A series of ratchet equipped tensioning straps or other similar devices are placed around the sheeting at spaced-apart locations along the length of the formed foam core. The straps or equivalent devices are then sequentially tightened to compress the foam by the desired amount, with the sheeting protecting the surface of the foam core and distributing the compressive force that results by tightening the straps. In some cases, such as large foam cores and/or relatively dense foam, it may be necessary to tighten the tension straps in stages, pausing between stages to allow the foam to reach the state then caused by the tension straps.

As one alternative to mechanical compression, the formed foam object is pneumatically compressed by inserting the foam object in a conventional hyperbaric chamber and increasing the air pressure within the chamber to achieve the desired amount of compression. Use of the hyperbaric chamber is especially advantageous in situations in which the foam core is small or is of irregular geometry that does not provide a smooth and uniform surface that is easily compressed by means of mechanical compression.

Once the formed foam is mechanically or pneumatically compressed to the desired state of compression, the fourth operation is placing it in the interior of the sleeve or shell. The zipper or other arrangement allowing access to the interior of the sleeve or shell is used to close off the interior of the sleeve or shell. As the compressed foam expands, its outer surface contacts the interior surface of the sleeve or shell. As expansion of the foam continues, the sleeve or shell is placed under tension that is sufficient to cause the outer surface of the sleeve or shell to be uniform and of the desired shape and contour.

In an alternative to the above-described mechanical and pneumatic compression techniques, the foam object is compressed using inflatable air bladders to assert the compressive force. The use of this technique can be advantageous in that it is portable in the sense that it can easily be employed at sites other than the location at which a boat is manufactured. Moreover, this alternative technique can be used to compress oversized foam cores that correspond to the full shape and geometry of the sleeve or shell that is to encase the foam core. On the other hand, this technique can be used to compress oversize foam cores that correspond to only a portion of the full shape and geometry of the encasing sleeve or shell. When a compressed foam core that corresponds to the full shape and geometry of the sleeve or shell is compressed, it is placed in the interior of the sleeve or shell; the sleeve or shell is zipped or otherwise closed off; and the foam core is allowed to expand so that it presses against the interior surface of the sleeve or shell to thereby form an object of desired shape and rigidity. In situations in which an oversized foam core that corresponds to a portion of the size and shape of the object is being formed, the compressed foam core and a suitably sized insert of foam or other material is placed in the encasing sleeve or shell that may already be mounted to the boat. As is the case with the above-discussed use of foam cores that correspond to the full shape and geometry of the sleeve or shell, the sleeve or shell is then zipped or otherwise closed off and the compressed foam core is allowed to expand toward its original size.

Shown in FIG. 1 is an exemplary arrangement in which air bladders are used to compress elongate sections of oversize foam cores of the type used in the manufacture of foam boat collars. In the arrangement of FIG. 1, two elongate foam cores having a D-shaped cross-sectional geometry are placed in back-to-back relationship within a longitudinally extending tubular enclosure 12 that extends at least the full length of the D-shaped foam cores 10. Located between the inner wall of the tubular enclosure 12 and the outer surface of each D-shaped foam core 10 is an air bladder 14, which extends over at least a major portion of the curved surfaces of foam cores 10. Also indicated in FIG. 1 are two elongate spacers 16, with each spacer 16 being located between the back-to-back foam cores 10 and the inner surface of tubular enclosure 12 and, in addition, extending between spaced-apart end boundaries of air bladders 14. Elongate spacers 16 may be formed of any material that undergoes little or no compression when air bladders 14 are inflated to compress the shaped foam cores 10. Elongate spacers 16 are optional, not being necessary in order to practice the invention. However, in some situations, spacers such as elongate spacers 16 of FIG. 1 can advantageously be employed to control the distribution of the compressive force that is exerted on the surface of the foam core.

Tubular enclosure 12 of FIG. 1 may be formed of a fabric membrane, metal, a composite material or various types of plastic. In particular, tubular enclosure 12 is preferably constructed of material that exhibits little or no expansive stretching when air bladders 14 are inflated to a pressure that compresses foam cores 10 to a desired size. In that regard, sufficient compression is needed so that the foam cores 10 can be removed from the elongate enclosure 12 and can be installed within a shell or sleeve while the compressed foam core is small enough for easily placing it within the shell or sleeve.

Although tubular enclosure 12 of FIG. 1 is shown as being cylindrical, it should be recognized that various other cross-sectional geometry can be employed to accommodate foam cores of different geometry. Further, it should be recognized that tubular enclosure 12 need not be structures having a single continuous wall. For example, tubular enclosure 12 of FIG. 1 could be two symmetrical sections with latches being located diametrically opposed to a longitudinally extending hinge. In such an arrangement, tubular enclosure 12 can be swung open and closed for positioning foam cores 10 and air bladders 14 within tubular enclosure 12, as well as swung open for removal of the foam cores 10 after compression by air bladders 14.

Air bladders 14 can be constructed of a variety of fabrics and membranes of the type used for inflatable devices. Examples include urethane-coated nylon membranes, and various fabrics having a rubber-based interior coating and unsupported urethane film. A conventional air valve (not shown in FIG. 1) is located in an accessible region of each air bladder 14 so that the air bladder 14 may be inflated with the foam core or cores 10 and air bladder or bladders 14 encased by a suitable enclosure 12. For example, with respect to the arrangement shown in FIG. 1, the air valves may be located at one or both ends of the longitudinally extending air bladders 14. Although the arrangement of FIG. 1 includes two air bladders 14, it should be recognized that more than two, or even one, air bladder may be employed. In that regard, the shape, size, and number of air bladders used are dependent upon the size and shape of the foam core or cores that will be subject to compression. Further, the pressure to which the air bladders are inflated may vary from as little as 0.5 pounds per square inch to 50 pounds per square inch, depending upon the size and shape of the foam cores, the type of foam being used, the density of that foam, and other factors. Likewise, the time required to suitably compress a foam core is dependent upon various factors such as the size and shape of the foam, foam density, and the rate at which the air bladders are (or, in some cases, can be) inflated. Because the invention has various applications using various types and densities of polymeric foam, it may be necessary to empirically determine parameters, such as the amount of air pressure used to compress the foam by a desired amount and the rate at which the air bladders are inflated, and further, whether it is necessary to use a sequence of inflation steps that allow the foam core or cores to reach a partially-compressed state before introducing additional air pressure. Additionally, in some cases it may be desirable (or even necessary) to empirically determine the number, size, and shape of air bladders to be employed. For example, in some situations, it may be desirable or even necessary to compress only selected portions of the foam core.

Figure 2:
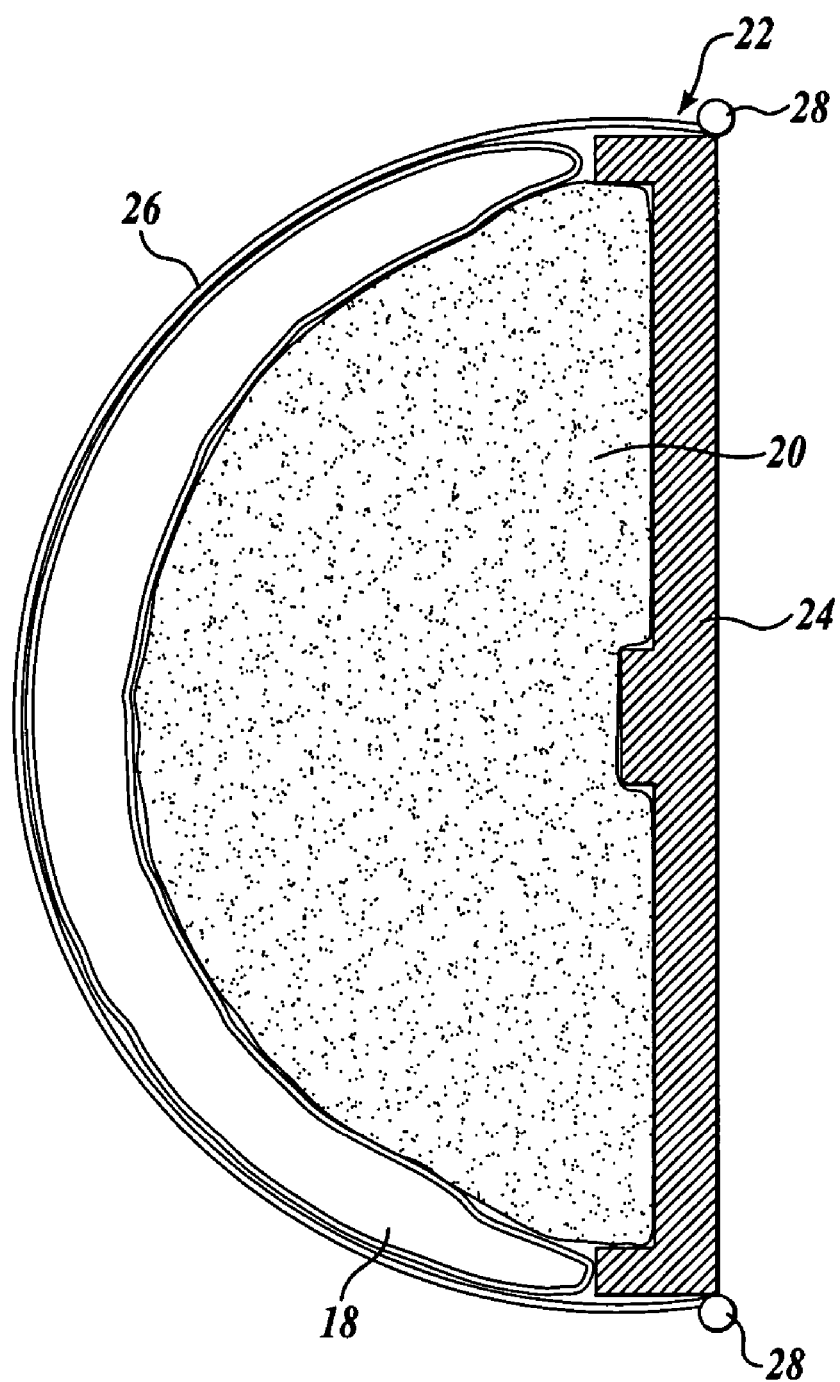

FIG. 2 illustrates an alternative arrangement of the present invention in which a single inflatable air bladder 18 is used to compress an elongate section of foam core 20 with the foam core 20 and air bladder 18 being positioned within a compression fixture 22. As can be seen in FIG. 2, the depicted foam core 20 is essentially D-shaped in cross-sectional geometry and includes an elongate channel that extends longitudinally along the center of the flat surface of the foam core 20. Compression fixture 22 includes a back plate 24 and an enclosure panel 26 that encompasses air bladder 18 and the curved surface of foam core 20. In the depicted arrangement, back plate 24 can be formed of various materials, such as metal, or machined or composite plastic material that is essentially incompressible under the forces exerted on the back plate 24 during compression of foam core 20.

In the particular arrangement shown in FIG. 2, back plate 24 is similar in size and shape to a mounting plate (not shown) that extends longitudinally along the sides of a boat that employs foam sponsons having a foam core that corresponds to foam core 20 in FIG. 2. Although back plate 24 of FIG. 2 matches the mounting plate on a boat on which foam core 20 will be installed, it should be noted that foam core 20 could be compressed without the use of this matching feature. Further, two foam cores configured in the manner of foam core 20 can be placed back to back and compressed in the arrangement described relative to FIG. 1.

Like tubular enclosure 12 of FIG. 1, enclosure panel 26 of FIG. 2 can be formed of fabric, a synthetic membrane, metal, a composite material, or various other materials. In FIG. 2, enclosure panel 26 is secured to the top and bottom of back plate 24 by retainers 28. A variety of devices can be used for retainers 28 with the requirement being that the retainers allow access for placement of foam core 20 and air bladder 18 against back plate 24 in the manner shown in FIG. 2, and allow foam core 20 to be removed after the compression process. In some situations, it may be advantageous to use a single hinge or spaced-apart hinges as a replacement for one of the retainers 28 so that enclosure panel 26 remains connected to back plate 24 and can be swung between an open and a closed position.

Figure 3A:
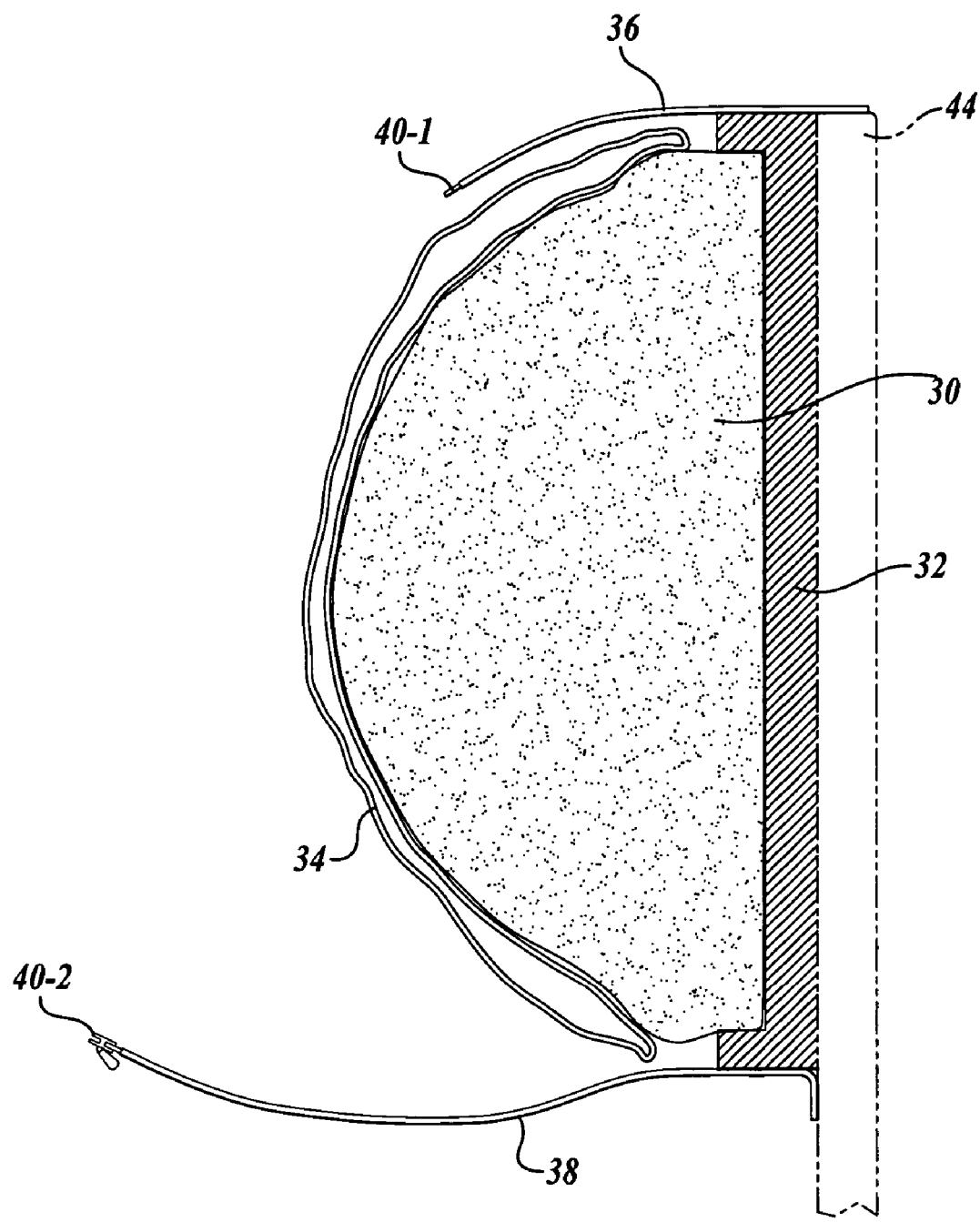
FIGS. 3A–3C illustrate an arrangement that can be used to implement a two-step process in which polymeric foam boat collars are fabricated and installed on a boat.
Figure 3B:
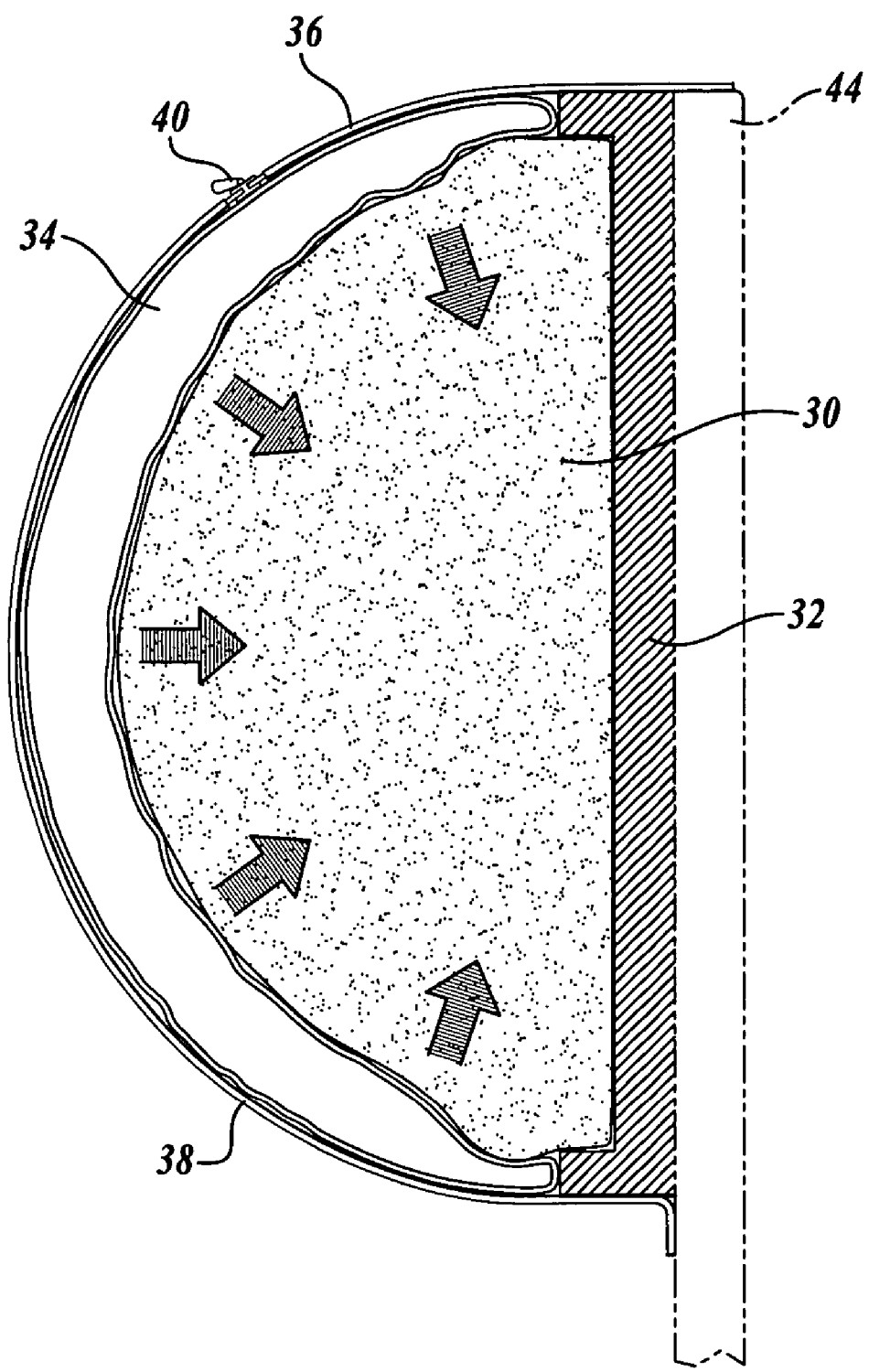
Figure 3C:
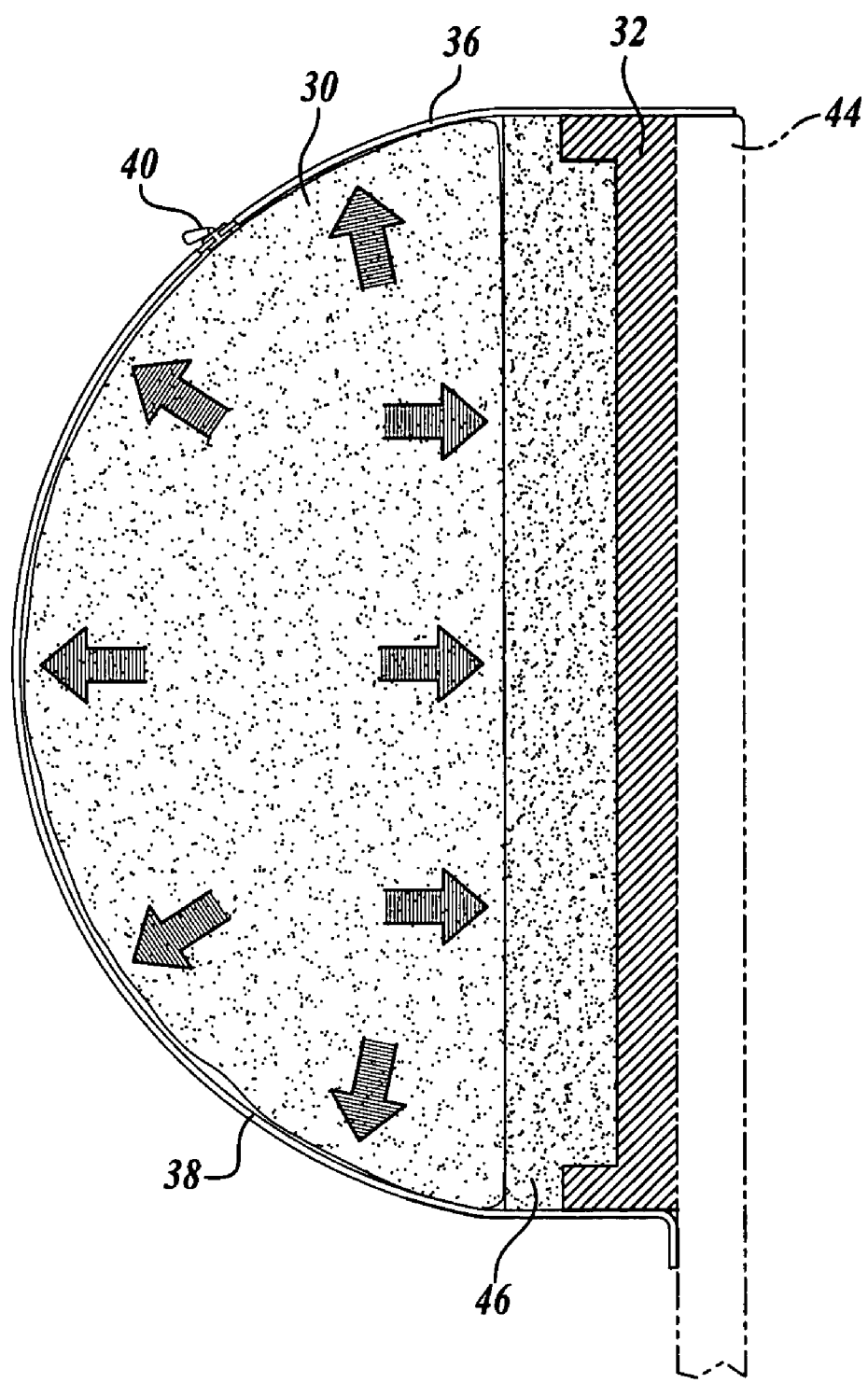

FIGS. 3A–3C depict an arrangement in which an oversized foam core corresponding to a portion of the shape and geometry of the shell or sleeve that is to encase the foam core is compressed, combined with a spacer formed of uncompressed foam or other material encased with the sleeve or shell with the compressed foam expanding to exert pressure on the shell or sleeve. In the arrangement of FIGS. 3A–3C, the sleeve is located on a boat and is the covering for a sponson. Thus, the arrangement can be used for producing a foam boat collar when a boat is manufactured and, in addition, used for retrofitting a boat with foam collars or replacing foam collars at locations remote from the facility at which the boat was built.

With reference to FIG. 3A, it can be noted that similarity to the arrangement of FIG. 2 exists in that a section (or sections) of foam core 30 is positioned in abutment with a back plate 32 and an air bladder 34 is placed about the curved periphery of foam core 30. However, unlike the arrangement of FIG. 2, foam core 30 corresponds to only a portion of the interior shape of the boat collar being formed and back plate 32 is welded or otherwise secured to the side of the boat (designated by numeral 44 in FIGS. 3A–3C). Extending from the top and bottom of back plate 32 are an upper sponson panel 36 and a lower sponson panel 38. The mating portions of a zipper (indicated by numerals 40-1 and 40-2 in FIG. 3A) are located along the edges of upper and lower sponson panels 36 and 38 that are not affixed to back plate 32. As is shown in FIG. 3B, upper and lower sponson panels 36 and 38 are dimensioned to enclose air bladder 34 and foam core 30 by closure of zipper elements 40-1 and 40-2. In that regard, the dimensions of upper and lower sponson panels 36 and 38 also determine the dimensional characteristics of the sponson, once the process associated with FIGS. 3A–3C is complete. As can be recognized with respect to FIG. 3B, inflation of air bladder 34 compresses foam core 30 in the same way that foam cores 10 and 20 of FIGS. 1 and 2 are compressed.

FIG. 3C illustrates the manner in which foam core 30 (in its compressed state) is installed to form the boat sponson. A spacer 46 formed of polymeric foam, which may be the same material as the foam used in fabricating foam core 30 (or another suitable material), is received by back plate 32. Foam core 30 (in its compressed state) is positioned in abutment with the outer face of spacer 46. As is indicated in FIG. 3C, when the zipper 40 is closed to join together the edges of upper and lower sponson panels 36 and 38, the compressed foam core 30 and spacer 46 are positioned in close relationship with one another and back plate 32. As the compressed foam core 30 expands, joined-together upper and lower sponson panels 36 and 38 are placed under tension to thereby form a boat collar (in this case, a sponson) exhibiting physical properties—such as energy absorption and resistance to dents and dings as well as fuel or chemicals that may come in contact with the boat collar.

With continued reference to the fabrication of foam core collars for boats, the sleeve or shell that encloses the foam core (e.g., sponson panels 36 and 38) is constructed of material such as a woven or knitted polyester and/or nylon fabric that is coated with polyurethane or polyurethane that is blended with polyvinylchloride (PVC). Synthetic rubbers may also be used such as chlorosulfonated polyethylene, which is commonly identified by the trademark "HYPALON." As will be recognized by those skilled in the art relating to boat collars, the same types of material are used in the construction of inflatable floatation collars. Each of these materials is relatively flexible within the context of the present invention. That is, when the inner surface of a sleeve or shell formed of the material is placed under tension by the encased polymeric foam, the outer surface of the sleeve becomes firm and assumes the desired size and shape.

With respect to foam boat collars, the tubular sleeve is dimensioned and shaped to match the contour of the boat on which the collar is to be mounted. Currently, design work has been completed or is under way to produce foam collars for boats ranging in length from approximately ten feet up to approximately fifty feet. With respect to cross-sectional geometry, the designs that have been completed or are under way utilize both D-shaped sponsons, like those disclosed in the previously referenced Hansen patents, and sponsons of circular cross-section, as disclosed in the previously referenced Hansen patent application and the Hemphill et al. patent. The preferred width or diameter of the tubular collar ranges from approximately eight inches for smaller boats up to approximately 36 inches for the largest boats. Similarly, the weight of the material used to form the tubular sleeve varies according to boat size and the use for which the boat is designed (e.g., recreational, commercial, etc.). Material suitable for use in the manner in which the invention will be initially practiced range between what is known as 20-ounce material and 50-ounce material. In extremely demanding situations, even heavier material (e.g., up to 90-ounce) can be used.

The way the tubular sleeve is fabricated from the selected material is substantially the same as the way inflatable floatation collars are manufactured. That is, the fabric is cut in accordance with a pattern for the boat on which the collar is to be used and the patterned pieces of fabric are thermally welded or otherwise bonded together. To allow access to the interior of the tubular shell for placement of the foam, an opening is included along the perimeter of the tubular shell. In the currently preferred practice of the invention, a zipper is sewn into the opening. Most preferably, and especially with respect to large foam collars, a double-zipper configuration is used in which two zippers are sewn together, one on top of the other with a single conventional tabular zipper pull being used to open and close both zippers simultaneously.

With respect to polymeric foam for use in fabricating a boat collar in accordance with the invention, the use of closed cell polypropylene and polyethylene material is preferred since objects formed of that material can be compressed and when no longer subjected to compressive forces will return to their original state, typically having no more than two percent residual compression. Further, polypropylene and polyethylene foam materials exhibit very low water absorption, thus remaining buoyant even under circumstances where the sleeve of a foam collar has been damaged. The density of the foam material generally is selected as a trade-off between collar buoyancy (low-density foam) and resistance to impact during maneuvers such as docking (higher density foam). This trade-off is affected by both the size and intended use of the boat employing the foam collar. Currently, the practice of the invention can use foams having densities ranging from approximately 0.05 pounds per cubic foot to 5 pounds per cubic foot, thus allowing a high degree of design latitude. By way of example and not limitation, a foam density of 1 pound per cubic foot has been used in fabricating a foam collar for a 25-foot boat with the diameter of the sponsons being 21½ inches. With further regard to selecting an appropriate foam material, reference may be taken to ASTM 3575, which is entitled "Structural Properties of Plastics," and is published by the American Society for Testing and Materials. That publication is used by the manufacturers of polymeric foam material to determine and publish material properties that are important to the design of foam collars, including material density, buoyancy, tensile and tear strength, as well as the degree to which an item formed of the foam will return to its original shape and size after being compressed.

Although it is possible to cast or mold the polymeric foam for use in small boat collars, it often will be more practical to machine the foam material to a shape that matches the expanded interior shape of the tubular sleeve (i.e., the shape of the collar being made). As mentioned with respect to the tubular sleeve, the cross-sectional geometry typically used for boat collars is circular or D-shaped. Regardless of the exact cross-sectional geometry, the cross-sectional dimensions of the foam core that is constructed of the foam material exceed the corresponding dimensions of the interior of the tubular sleeve. For example, with reference to the previously mentioned collars for a 25-foot boat, the interior diameter of the sleeve (when fully expanded) is 21½ inches, an uncompressed diameter of the foam core is 23 inches. At this point in time, an appropriate "rule of thumb" appears to be an unexpanded foam core size that is oversized by approximately eight percent.

With continued reference to the foam core, it sometimes is necessary to fabricate the core in sections that are not as long as one side of the collar being produced. Specifically, the curvature or tangential angle of the boat hull near the bow of the boat or other areas may require the use of shorter sections of foam that are placed in the tubular shell in lengthwise abutment with one another. In such cases, it can be advantageous to dimension the foam sections slightly longer than required so that lengthwise expansion of the sections within the sleeve will press the sections together and tension the tubular shell in the longitudinal direction. By way of example, with respect to the foam core used in the fabrication of a collar for a 25-foot boat, foam sections having an intended final length of 24 inches were 24½ inches prior to being compressed and placed in the tubular sleeve.

Compressing the foam core or core sections for placement in the tubular shell can be accomplished by the previously discussed mechanical means, the use of a hyperbaric chamber, or by the use of inflatable air bladders. With respect to foam collars having a circular or "D" cross-sectional shape, the use of the mechanical compression technique or the air bladder technique may be more advantageous than compression in a hyperbaric chamber. In that regard, the compressed foam core sections can be stored while remaining under compression, thus allowing efficient production scheduling and, in the case of relatively large foam collars, the ability to process the number of foam core sections required to completely fill the tubular sleeve. Preferably, the degree to which the foam cores are compressed is determined by the density of the foam, the ease of compressing the foam, and the expansion rate of the foam once the compressive force is no longer present. In particular, the minimum amount of compression must allow time for the foam to be placed in the tubular sleeve and, additionally, should be established so that the time required for the foam to expand within the tubular sleeve is of reasonable length. With reference to the exemplary situation of fabricating a foam collar for a 25-foot boat, the foam core is formed so that it is approximately eight percent (8%) oversize relative to the diameter of the foam collar, and the core is compressed to eighty-two percent (82%) of its original size.

In the final steps of fabricating the foam collar, one or more sections of foam core that are needed to fill the tubular sleeve are placed in the sleeve, the sleeve is closed by means of the zipper, and the foam is allowed to expand. As previously noted, the interior volume of the tubular sleeve does not allow the foam core to fully expand so that the tubular sleeve of the foam collar is placed under tension.

Various factors determine the amount of time required for the foam core to expand to the point at which the tubular sleeve is under tension to the point at which no further expansion takes place. The factors include the degree to which the foam core has been compressed, the size of the foam core, the density of the foam being used, ambient temperature, and even the technique that was employed to compress the foam core. In particular, the expansion rate of foam cores that have been mechanically compressed tends to be slower than the expansion rate of foam cores that have been compressed in a hyperbaric chamber or with air bladders. With respect to boat collars, some foam cores, especially larger cores, may not reach the point at which the sleeve arrests further expansion for two days or more.

Figure 4:
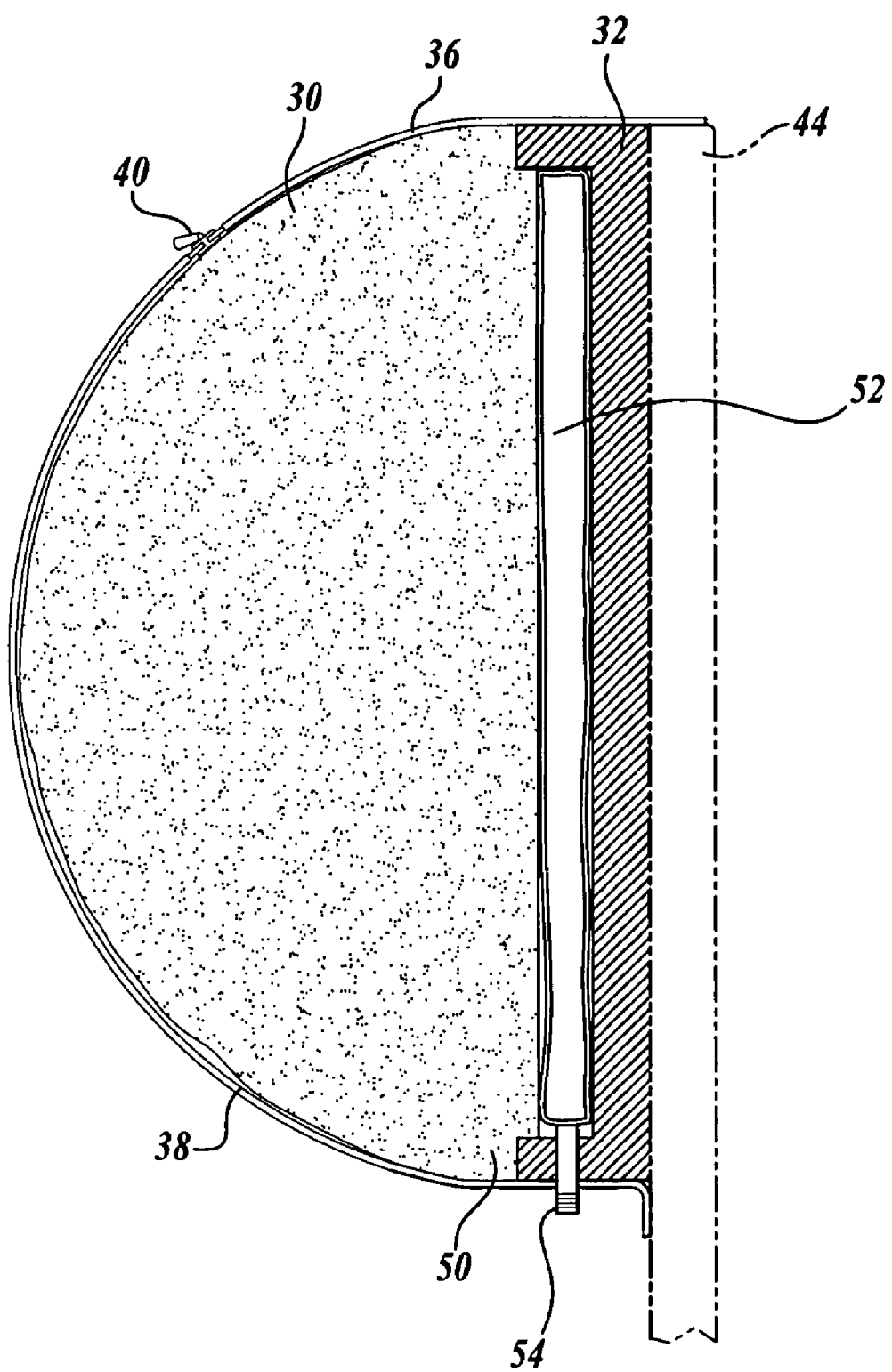

In some situations, eliminating the delay associated with a low foam core expansion rate may be desirable. For example, in the manufacture of foam cored boats, the installation of the boat collars may be one of the final steps of a production schedule. In such a case, a final inspection and delivery of the boat could be delayed longer than desired. Shown in FIG. 4 is an arrangement that allows the foam collars to be fully serviceable when a compressed foam core is installed to form the boat collar. This arrangement also facilitates removal of the foam core from the collar should replacement or repair be required.

FIG. 4 differs from previously described FIG. 3C in two respects. First, in its uncompressed state, foam core 50 of FIG. 4 is an oversized core that corresponds to the full cross-sectional geometry of the containment sleeve (formed by the zipped-together upper and lower sponson panels 36 and 38). Second, an air bladder 52 occupies all or a portion of the space occupied by spacer 46 in FIG. 3C. That is, air bladder 52 is positioned between back plate 32 and compressed foam core 50.

Although not specifically shown in the figures, it can be recognized that foam core 50 and air bladder 52 are installed on a boat in the same manner as was described relative to FIG. 3A–3C. That is, with zipper 40 open, air bladder 52 (in a deflated state) is placed in abutment with back plate 32 and the flat surface of D-shaped foam core 50 is placed against the outboard side of air bladder 52. The upper and lower sponson panels 36 and 38 are then zipped together with zipper 40 to fully encase compressed foam core 50 and air bladder 52. Air bladder 52 is then inflated to a pressure at which foam core 50 presses against the interior surfaces of zipped-together upper and lower sponson panels 36 and 38 in a manner substantially the same as what would occur if foam core 50 were allowed to expand without air bladder 52 being inflated. To allow inflation and deflation, air bladder 52 includes a valve such as, or similar to, the valve stems used for inflation of vehicle tires. In FIG. 4, a valve stem 54 is shown projecting downwardly from the lower leg of back plate 32. In arrangements in which the sponson extends aft of the boat transom, air valve 54 preferably extends through the sidewall of back bracket 32 at a position aft of the transom. Regardless of the location of air valve 54, foam core 50 of the arrangement shown in FIG. 4 is allowed to expand by periodically allowing air to escape from air bladder 52 via air valve 54. When foam core 50 has expanded to the maximum state allowed by zipped-together upper and lower sponson panels 36 and 38, air bladder 52 will contain little or no air.

As previously noted, the arrangement of FIG. 4 also allows foam core 50 to be easily removed for replacement or repair. Specifically, to gain access to or remove foam core 50, air bladder 52 is inflated to compress foam core 50 to a point at which it easily can be removed by unzipping zipper 40. In that regard, when foam core 50 has been compressed sufficiently, air bladder 54 is deflated, zipper 40 is opened, and foam core 50 is exposed for removal or repair.

While the invention has been described in terms of its currently preferred implementation, it will be appreciated that various changes can be made therein without departing from the spirit and scope of the invention. For example, although the arrangements discussed relative to FIGS. 1–4 utilize air bladders, bladders inflated with other gases and/or various fluids, such as water, can be used. Additionally, the various materials that encompass the foam cores both during compression and as the sleeve or shell that surrounds the finished foam core item may depart from those that have been described. Specifically, any materials that provide the described functional characteristics can be employed.

The embodiments of the invention in which an exclusive property or privilege is claimed are defined as followed:

1. A method of fabricating a boat collar comprising the steps of:
   (a) forming a sleeve generally in the shape of a boat collar, the sleeve having an interior and having a sealable opening;
   (b) fabricating one or more inserts for placement in said interior of said sleeve, said one or more inserts being formed of compressible polymeric foam, having a shape that corresponds approximately to at least a portion of the shape defined by said interior of said sleeve;
   (c) compressing said one or more foam inserts to a size less than the size of said corresponding portion of said interior of said sleeve;
   (d) placing the compressed foam inserts into said interior of said sleeve;
   (e) closing said sealable opening of said sleeve; and
   (f) allowing the compressed foam inserts to expand so that the expanded foam inserts bear firmly against said sleeve.

2. The method of claim 1, wherein said foam inserts are formed from a compressible polypropylene foam.

3. The method of claim 2, wherein the density of said compressible polypropylene foam is within a range of approximately 0.05 pounds per cubic foot to approximately 5.0 pounds per cubic foot.

4. The method of claim 3, wherein said step of forming the sleeve includes the step of installing a zipper for allowing access to said interior of said sleeve.

5. The method of claim 1, wherein said foam inserts are formed from compressible polyethylene foam.

6. The method of claim 5, wherein the density of said compressible polyethylene foam is within a range of approximately 0.05 pounds per cubic foot to approximately 5.0 pounds per cubic foot.

7. The method of claim 6, wherein said step of forming the sleeve includes the step of installing a zipper for allowing access to said interior of said sleeve.

8. The method of claim 1, wherein said step of compressing said one or more foam inserts includes the steps of inserting said inserts in a hyperbaric chamber and increasing the atmospheric pressure in the hyperbaric chamber until the size of said one or more inserts is less than the size of said corresponding portion of said interior of said sleeve and is small enough to allow placement in said interior of said sleeve.

9. The method of claim 8, wherein said inserts are formed from a compressible polypropylene foam.

10. The method of claim 9, wherein the density of said compressible polyurethane foam is within a range of approximately 0.05 pounds per cubic foot to approximately 5.0 pounds per cubic foot.

11. The method of claim 1, wherein said step of compressing said one or more foam inserts includes the steps of surrounding peripheral regions of said inserts with tensioning belts and tightening the tensioning belts to compress said polymeric foam to a size less than the size of said corresponding portion of said interior of said sleeve.

12. The method of claim 11, wherein said foam inserts are formed from compressible polypropylene foam.

13. The method of claim 12, wherein the density of said compressible polypropylene foam is within a range of approximately 0.05 pounds per cubic foot to approximately 5.0 pounds per cubic foot.

14. The method of claim 1, wherein said step of compressing said one or more foam inserts includes the steps of placing said one or more foam inserts in an enclosure that surrounds and encases regions of said one or more inserts that are to be compressed, inserting one or more inflatable bladders that are positioned in voids formed between said enclosure and said one or more foam inserts, and inflating said one or more inflatable bladders to compress said regions of said one or more foam inserts.

15. The method of claim 14, wherein said foam inserts are formed from a compressible polypropylene foam.

16. The method of claim 15, wherein the density of said compressible polypropylene foam is within a range of approximately 0.05 pounds per cubic foot to approximately 5.0 pounds per cubic foot.

17. The method of claim 1, wherein the boat collar is of the type that is affixed to an external surface of a boat hull to serve as a fender or stabilizer, and wherein said step of compressing said one or more foam inserts includes the steps of inserting said inserts into a hyperbaric chamber and increasing the atmospheric pressure in the hyperbaric chamber until the size of said one or more foam inserts is less than the size of said interior of said sleeve and is small enough to allow placement in said interior of said sleeve.

18. The method of claim 17, wherein said foam inserts are formed from a compressible polypropylene foam.

19. The method of claim 18, wherein the density of said compressible polypropylene foam is within a range of approximately 0.05 pounds per cubic foot to approximately 5.0 pounds per cubic foot.

20. The method of claim 19, wherein said step of forming the sleeve includes the step of installing a zipper for allowing access to said interior of said sleeve.

21. The method of claim 1, wherein said inserts are formed from compressible polyurethane foam.

22. The method of claim 21, wherein the density of said compressible polyurethane foam is within a range of approximately 0.05 pounds per cubic foot to approximately 5.0 pounds per cubic foot.

23. The method of claim 22, wherein said step of forming the sleeve includes the step of installing a zipper for allowing access to said interior of said sleeve.

24. The method of claim 1, wherein the boat collar is of the type that is affixed to an external surface of a boat hull to serve as a fender or stabilizer, and wherein said step of compressing said one or more foam inserts includes the steps of peripherally wrapping said one or more foam inserts with a sheeting material with two edges of said sheeting material overlapping one another, surrounding peripheral regions of said sheeting material with tensioning belts, and tightening the tensioning belts to compress said one or more foam inserts to a size less than the size of said interior of said sleeve.

25. The method of claim 24, wherein said foam inserts are formed from a compressible polypropylene foam.

26. The method of claim 25, wherein the density of said compressible polypropylene foam is within a range of approximately 0.05 pounds per cubic foot to approximately 5.0 pounds per cubic foot.

27. The method of claim 26 wherein said step of forming the sleeve includes the step of installing a zipper for allowing access to said interior of said sleeve.

28. The method of claim 1, wherein the boat collar is of the type that is affixed to an external surface of a boat hull to serve as a fender or stabilizer, and wherein said step of compressing said one or more foam inserts includes the steps placing said one or more foam inserts in an enclosure that surrounds and encases at least a portion of said one or more inserts, inserting one or more inflatable bladders in voids formed between said enclosure and said one or more foam inserts, and inflating said one or more inflatable air bladders to compress said one or more foam inserts.

29. The method of claim 28, wherein said enclosure is a shell that is mounted to a boat to form the outer covering of said collar, said step of placing said one or more foam inserts in said enclosure is the placement of one or more compressed foam inserts of a shape and size that will occupy only a cross-sectional portion of said enclosure, and wherein following the inflating of said one or more inflatable bladders to compress said one or more foam inserts, the method further comprises removing said one or more inflatable bladders and said one or more foam inserts while said one or more foam inserts are in a compressed state, placing one or more spacers of size and shape that will occupy the cross-sectional geometry of said enclosure not occupied by said one or more foam inserts in their unexpanded state, placing said one or more foam inserts in said enclosure while said one or more inserts remain in a compressed state, closing said enclosure, and allowing said one or more inserts to expand.

30. The method of claim 29, wherein said foam inserts are formed from a compressible polypropylene foam.

31. The method of claim 30, wherein the density of said compressible polypropylene foam is within a range of approximately 0.05 pounds per cubic foot to approximately 5.0 pounds per cubic foot.

32. The method of claim 31, wherein said step of forming the sleeve includes the step of installing a zipper for allowing access to and sealing off of said interior of said sleeve.

33. The method of claim 29, wherein said inserts are formed from compressible polyethylene foam.

34. The method of claim 33, wherein the density of said compressible polyethylene foam is within a range of approximately 0.05 pounds per cubic foot to approximately 5.0 pounds per cubic foot.

35. The method of claim 34, wherein said step of forming the sleeve includes the step of installing a zipper for allowing access to said interior of said sleeve.

36. The method of claim 28, wherein said enclosure is a shell that is mounted to a boat to form the outer covering of said collar, said step of placing said one or more foam inserts in said enclosure is the placement of one or more compressed foam inserts of a shape and size that will occupy the full cross-sectional area of said enclosure when said one or more foam inserts are allowed to expand, said step of placing said one or more compressed foam inserts in said enclosure being preceded by the step of placing one or more inflatable bladders in said enclosure, said inflatable bladders being positioned adjacent said boat and being in abutment with said one or more compressed foam inserts when said foam inserts are placed in said enclosure, and wherein said method further comprises closing said enclosure, inflating said one or more bladders to a pressure at which said one or more compressed foam inserts presses against the interior surface of said enclosure in substantially the same way as will said one or more foams inserts when said inserts are allowed to expand, and periodically decreasing the pressure asserted by said one or bladders against said one or more foam insets until said one or more foam inserts expand to the point at which further expansion is arrested by said enclosure.

37. The method of claim 36, wherein said inserts are formed from a compressible polypropylene foam.

38. The method of claim 37, wherein the density of said compressible polypropylene foam is within a range of approximately 0.05 pounds per cubic foot to approximately 5.0 pounds per cubic foot.

39. The method of claim 38, wherein said step of forming the sleeve includes the step of installing a zipper for allowing access to and sealing off of said interior of said sleeve.

40. The method of claim 36, wherein said foam inserts are formed from compressible polyethylene foam.

41. The method of claim 40 wherein the density of said compressible polyethylene foam is within a range of approximately 0.05 pounds per cubic foot to approximately 5.0 pounds per cubic foot.

42. The method of claim 41 wherein said step of forming the sleeve includes the step of installing a zipper for allowing access to and sealing off said interior of said sleeve.

\* \* \* \* \*

UNITED STATES PATENT AND TRADEMARK OFFICE
CERTIFICATE OF CORRECTION

PATENT NO. : 7,201,865 B2
APPLICATION NO. : 10/867379
DATED : April 10, 2007
INVENTOR(S) : W.M. Hansen Page 1 of 1

It is certified that error appears in the above-identified patent and that said Letters Patent is hereby corrected as shown below:

| COLUMN | LINE | ERROR |
|---|---|---|
| 13 (Claim 10, | 2 line 2) | "polyurethane" should read --polypropylene-- |
| 14 (Claim 27, | 11 line 1) | "26" should read --26,-- |
| 14 (Claim 29, | 35 line 12) | "of size" should read --of a size-- |
| 15 (Claim 36, | 11 line 18) | "foams" should read --foam-- |
| 16 (Claim 41, | 10 line 1) | "40" should read --40,-- |
| 16 (Claim 42, | 14 line 1) | "41" should read --41,--. |

Signed and Sealed this

Fourteenth Day of August, 2007

JON W. DUDAS
*Director of the United States Patent and Trademark Office*